Figure 1:
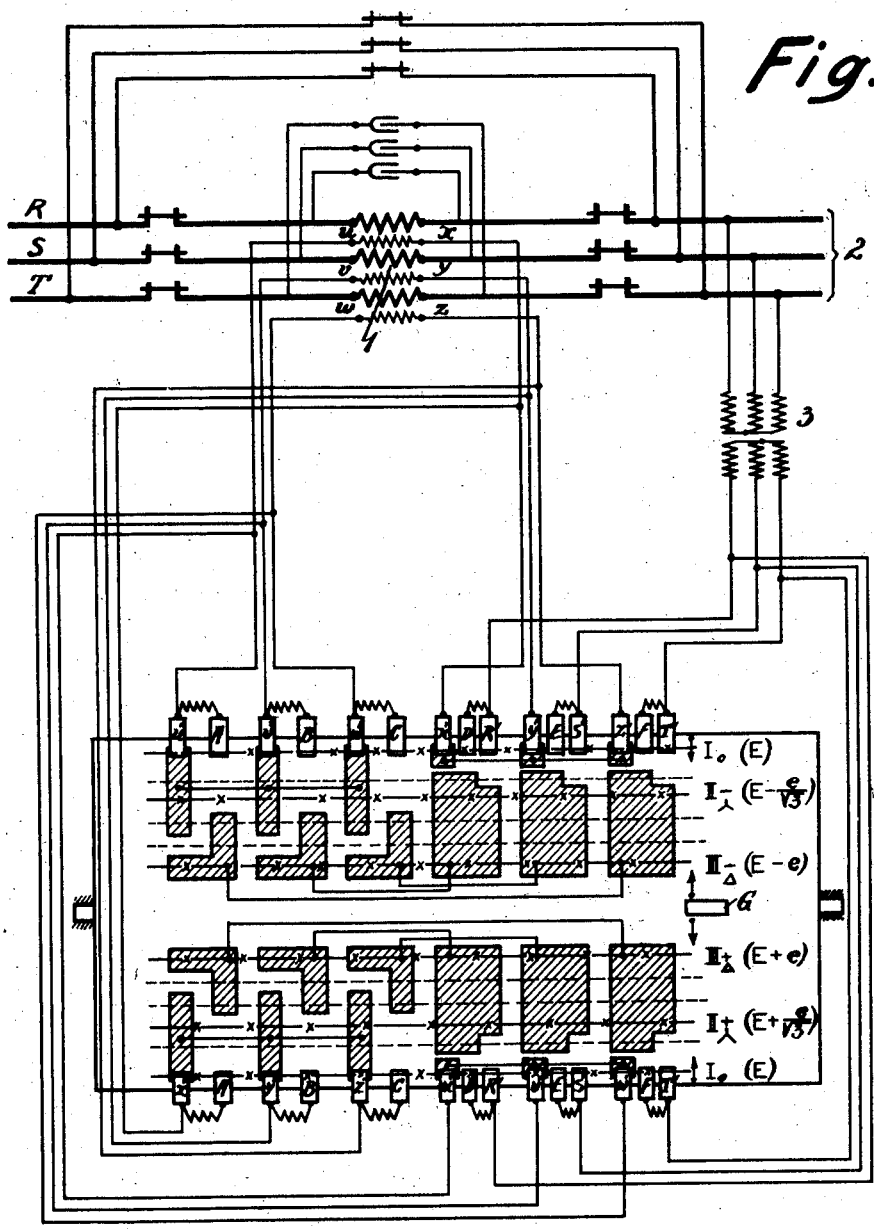

Jan. 29, 1929.  J. SESSINGHAUS  1,700,600
METHOD OF CONNECTING BOOSTER TRANSFORMERS
Original Filed April 17, 1924  3 Sheets-Sheet 2 a) $E+e$ b) $E+\dfrac{e}{\sqrt{3}}$ c) $E\pm o$ d) $E-\dfrac{e}{\sqrt{3}}$ e) $E-e$ Inventor
Johannes Sessinghaus
by Knight Bro
attorneys

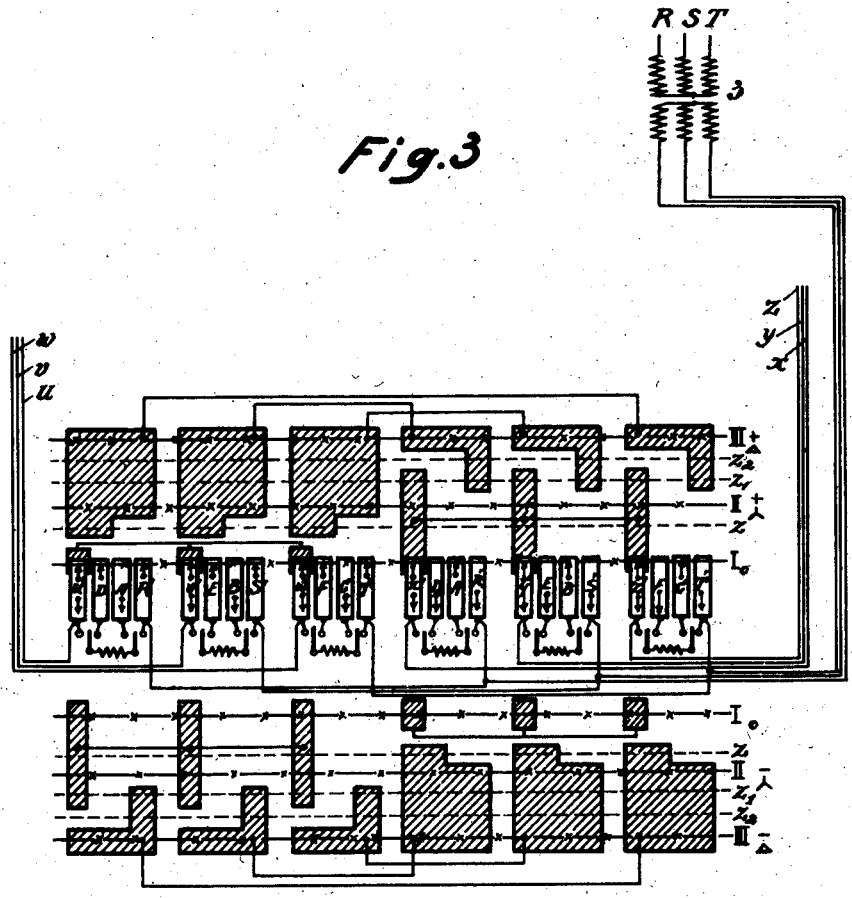

Patented Jan. 29, 1929.

1,700,600

UNITED STATES PATENT OFFICE.

JOHANNES SESSINGHAUS, OF BERLIN-CHARLOTTENBURG, GERMANY, ASSIGNOR, BY MESNE ASSIGNMENTS, TO WESTINGHOUSE ELECTRIC & MANUFACTURING COMPANY, A CORPORATION OF PENNSYLVANIA.

METHOD OF CONNECTING BOOSTER TRANSFORMERS.

Application filed April 17, 1924, Serial No. 707,228, and in Germany April 23, 1923. Renewed February 15, 1926.

My invention relates to a method of connecting a booster transformer, which is connected with its secondary windings with the conductors of a source of electrical energy.

The object of my invention is to enable the transformer to be switched in and out during service and to regulate its voltage in such a manner, that its primary windings are successively short-circuited and connected in star and in delta in one direction of connection by a suitable switch and that they are connected in the same manner in the opposite direction of connection, so that by this method of connection five voltage steps may be attained with a single booster transformer.

In the known connection of booster transformers in a three-phase net by the use of protective and starting switches voltage is added to the line without the possibility of regulating it. In the likewise known connection of a booster transformer by means of two protective and starting switches, into which the dissolved neutral point of the primary windings of the booster transformer is selectively placed, a regulation is obtained which comprises three voltage steps.

By the method of connecting the boosting transformer according to this invention a regulation is obtained which comprises five voltage steps.

My invention is diagrammatically illustrated in the drawings attached hereto and forming part of my specification. The drawings represent in—

Figure 2:
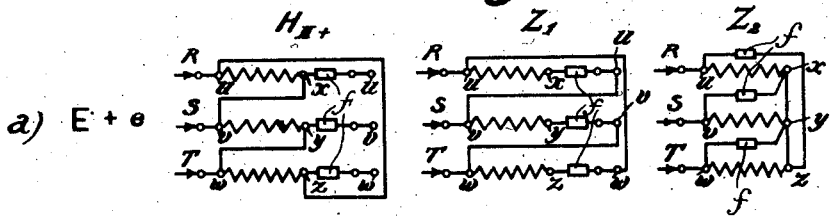
Figure 2:
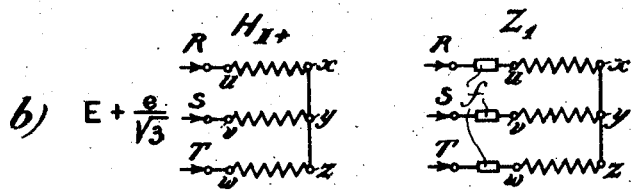
Figure 2:
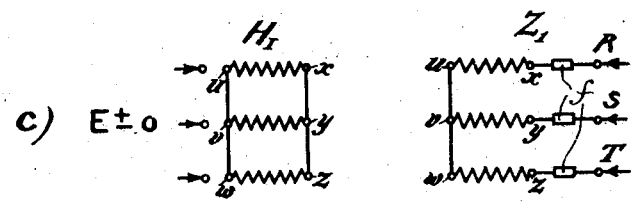
Figure 2:
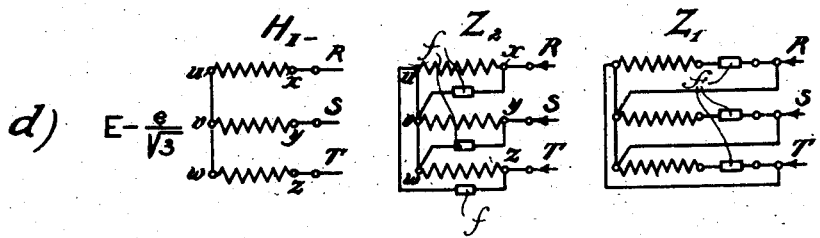
Figure 2:
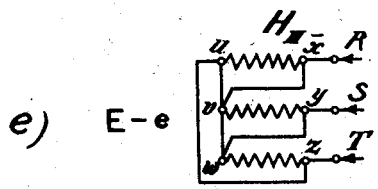

Fig. 1 the diagram of connection of a network according to this invention and a contact drum, Fig. 2 the connections for the exciter windings, protecting resistances and contacts for the five switch steps and intermediate positions and Fig. 3 is a simplified diagram of connections for a single row of brushes.

Similar parts are indicated by the same reference characters in the various figures of the drawings.

Referring to Fig. 1, which illustrates an example for carrying out the invention, 1 is a booster transformer connected in a three-phase main 2 with the phases R, S, T. The ends $u$, $v$, $w$, and $x$, $y$, $z$ of its primary windings are connected with sliding contacts indicated by the same letters, which in the example illustrated are brushes. The brushes slide from one connecting position into the other across contact segments, which by their position and shape, for instance upon a drum or barrel—here shown developed into a plane—control the flow of the current. The controller drum is adapted to be turned, in the direction shown by the arrows at the right, from the zero position towards the positive or the negative voltage side up to the stop G so that the proper sequence of connection is ensured. Of the two rows of brushes, which in Fig. 1 are disposed in two axially extending rows upon the controller drum, only the row selected for the positive or negative voltage direction during the switching operation is placed in conductive relation with the corresponding two-part panel of the contact segments, while the other row is simultaneously lifted off or rests upon a nonconducting part of the drum. In this manner either positive or negative booster voltages are supplied.

The connection from one voltage step to the other takes place across the intermediate positions without interrupting the circuit. For this purpose the two groups of brushes $u^1$, $v^1$, $w^1$ and $R^1$, $S^1$, $T^1$, have ther individual brushes connected respectively with brushes A, B, C and D, E, F, each across protective resistances, as shown in Fig. 1, and the contact segments, which are in groups partly short-circuited and partly in electrical connections with each other in a certain arrangement, are bridged over by the brushes during their passage from one contact segment to the other. With the brushes $R^1$, $S^1$, $T^1$ are connected the leads for the exciter energy.

The auxiliary transformer 3, the secondary side of which by the leads across the indicated brushes supplies the current to the controller drum, is necessary, if the exciter current for the booster transformer I is to be stepped down in the case of high tension in the network.

In the diagram of connections the switching positions I—III+ and the voltage steps obtained by them are clearly shown. The corresponding position of the brushes at any time is indicated by the lines (—x—x—x)

for the main positions and the lines (— — — — — —) for the intermediate positions. The positive sign of the booster voltage holds good for the connection towards the side with equally directed voltage, the negative sign for the connection towards the side with oppositely directed voltage.

In the switching position II+, for instance, the brushes $R^1$, $S^1$, $T^1$ and also $x^1$, $y^1$, $z^1$ are on the large contact segments. Hereby the leads of the exciter energy are directly connected with the primary windings of the booster. By the recesses of these contact segments an intermediate switching position is, however, previously effected in consequence of the brushes $x^1$, $y^1$, $z^1$, and the adjacent brushes D, E, F becoming electrically connected, while the brushes $R^1$, $S^1$, $T^1$ are thrown into the circuit over the resistances before they run themselves on the contact segments. The brushes $u^1$, $v^1$, $w^1$ rest upon the narrow and long contact strips, which are directly connected with each other, so that thereby the neutral point for the primary windings $u, v, w$ is established.

It will thus be obvious, that the primary side of the transformer 1 is in star connection with the lines R, S, T. The protective resistances situated between $x^1$, $y^1$, $Z^1$ and $R^1$, $S^1$, $T^1$ respectively are short-circuited at that time, and those between $u^1$, $v^1$, $w^1$ and A, B, C respectively carry no current, because their connecting brushes rest upon non-conducting portions of the drum. For the negative booster voltage and the position II— of the controller the other similar half of the contact segment group is used by which the lower corresponding phase brushes $R^1$, $S^1$, $T^1$ are similarly combined with the lower groups of brushes $u^1$, $v^1$, $w^1$.

For the switching position III± the flow of the current will be found to show a delta connection of the booster primary. There thus results for the switching position I a short-circuiting of the primary windings and the voltage E±O, for the switching position II the voltage step of the approximate value:

$$E \pm \frac{e}{\sqrt{3}}$$

and for the position III the step of the approximate value E±e.

A similar result is possible with only one row of brushes, as is illustrated in Fig. 3. The brushes slide by displacement or turning of the drum in the same grouping as previously described over the contact segments. When turning the drum in one direction to obtain a positive boosting voltage the brushes D, $R^1$, E, $T^1$, which are combined with the group $u^1$, $v^1$, $w^1$ and A, B, C, which are combined with the group $x^1$, $y^1$, $z^1$, and for a negative boosting voltage the brushes: A, B, C which are combined with the group $u^1$, $v^1$, $w^1$ and D, $R^1$, E, $S^1$, F, $T^1$, which are combined with the group $x^1$, $y^1$, $z^1$, are cut out prior to the switching operation, for instance by lifting off. The protective resistances are, however, switched in between the groups of brushes $u^1$, $v^1$, $w^1$ and A, B, C on the one hand, as well as $R^1$, $S^1$, $T^1$ and D, E, F on the other hand for the positive boosting voltage side, and for the negative side between the groups of brushes $x^1$, $y^1$, $z^1$ and A, B, C, as well as between the brushes $R^1$, $S^1$, $T^1$ and D, E, F in the same arrangement as in the corresponding switching operation in Fig. 1.

The same group of brushes $u^1$, $v^1$, $w^1$ and $x^1$, $y^1$, $z^1$ are thus here used for both switching directions.

To facilitate the understanding arrows have been drawn in the brushes in Fig. 3, which indicate the direction in which the brushes should slide over the contact segments.

The contact panels are only drawn apart in Fig. 3 in order to enable the brushes to be marked more clearly. The two reference lines for the switching position I must be understood as coinciding.

Referring to Fig. 2, (steps $a, b, c, d, e$) the connections of the exciter windings, resistances and contacts for the five switching positions and the various intermediate connections are diagrammatically shown.

Thus the switching operation when changing from the delta connection into the star connection will be understood from Fig. 2 and from the main position $H_{111}$ and the two following intermediate positions $Z_1$ and $Z_2$. In the main position $H_{111}$ the three primary windings of the transformer 1 are connected in delta with the three phases of the net, while the protecting resistances $f$ and the intermediate contacts carry no current. The change from the star connections (positions $H_{11}$) to the delta connections (positions $H_{111}$) is facilitatetd for positive as well as negative boosting, by means of two intermediate steps of connections $Z_1$ and $Z_2$. In that case the protecting resistances $f$ are connected in position $Z_1$ in series, and in position $Z_2$ in parallel with the pertaining primary coils of the booster transformer.

In the same way the flow of the current in changing the connection from one voltage step to the other can be seen in the other diagrams of connections. In the switching operation the intermediate steps are quickly passed over, in order to load the fuses as little as possible.

This connection with 5 voltage steps is ample for many service conditions and is valuable for branch and coupling lines of power stations as well as for the regulation of rotary converters and rectifiers.

The advantage obtained resides particularly in the simplification of the switch gear for the voltage regulation in the above mentioned cases. The number of switches is diminished and special regulating devices, which were necessary besides the switches and separating switches, are eliminated. Breakdowns caused by the great wear and tear of the apparatus used hitherto are entirely avoided.

It will be readily understood, that I do not limit myself to the exact details of construction shown by way of example but that these may be modified in various ways within the scope of my claims by those skilled in the art.

What I claim as my invention and desire to secure by Letters Patent is:—

1. The method of connecting a multiphase booster transformer, which is connected with its secondary windings with the conductors of a source of electrical energy in order to enable it to be switched in and out during service, and of controlling its voltage, which consists in successively short-circuiting and connecting in one sense the primary windings of said transformer in star and delta, and in then similarly connecting said windings in the opposite sense, so that five voltage steps are obtained with a single booster transformer.

2. In a three-phase booster system for alternating current mains the combination of a booster transformer, having its secondary windings connected into said mains, with a contact device comprising contact elements and brushes relatively movable thereto and protecting resistances connected between some of said brushes, the end of the primary windings of said transformer being connected with some of said brushes, said contact elements being suitably shaped to successively short-circuit said primary windings and to connect them in star and delta to either raise or lower the voltage in said mains in accordance with the direction in which said windings are connected in circuit relatively to said secondary transformer windings, and a source of alternating current connected with others of said brushes for supplying the booster energy to said system.

3. In a three-phase booster system for alternating current mains the combination of a booster transformer, having its secondary windings connected into said mains, with a contact device comprising a rotatable drum having a plurality of fixed brushes disposed on said drum to cooperate in suitable steps with said contact elements when said drum is rotated and protecting resistances connected between some of the said brushes, the ends of the primary windings of said transformer being connected with some of said brushes, said contact elements being suitably shaped to successively short-circuit said primary windings and to connect them in star and delta when said drum is rotated to either raise or lower the voltage in said mains in accordance with the direction in which said windings are connected in circuit relatively to said secondary transformer windings, and a source of alternating current connected with others of said brushes for supplying the booster energy to said system.

4. In a three-phase booster system for alternating current mains the combination of a booster transformer, having its secondary windings connected into said mains, with a contact device comprising a rotatable drum having a plurality of fixed brushes disposed on said drum to cooperate in suitable steps with said contact elements when said drum is rotated and protecting resistances connected between some of the said brushes, the ends of the primary windings of said transformer being connected with some of said brushes, said contact elements being suitably shaped to successively short-circuit said primary windings and to connect them in star and delta when said drum is rotated to either raise or lower the voltage in said mains in accordance with the direction in which said windings are connected in circuit relatively to said secondary transformer windings, and a separate transformer connected between said mains and others of said brushes for supplying the desired booster energy to said system.

5. The method of varying the electrical conditions of a transformer comprising a plurality of windings which comprises successively connecting the windings in star and delta first in one relation and then in reversed relation to produce voltages having respectively different relative phase positions in a plurality of directions from a neutral position.

In testimony whereof I affix my signature.

JOHANNES SESSINGHAUS.